United States Patent
Hao et al.

(10) Patent No.: US 10,139,967 B2
(45) Date of Patent: Nov. 27, 2018

(54) TOUCH SCREEN AND DISPLAY DEVICE

(71) Applicants: BOE TECHNOLOGY GROUP CO., LTD., Beijing (CN); ORDOS YUANSHENG OPTOELECTRONICS CO., LTD., Ordos, Inner Mongolia (CN)

(72) Inventors: Xueguang Hao, Beijing (CN); Cheng Li, Beijing (CN); Peimao Li, Beijing (CN); Jun Fan, Beijing (CN)

(73) Assignees: BOE TECHNOLOGY GROUP CO., LTD., Beijing (CN); ORDOS YUANSHENG OPTOELECTRONICS CO., LTD., Ordos, Inner Mongolia (CN)

(*) Notice: Subject to any disclaimer, the term of this patent is extended or adjusted under 35 U.S.C. 154(b) by 341 days.

(21) Appl. No.: 14/895,365

(22) PCT Filed: Apr. 22, 2015

(86) PCT No.: PCT/CN2015/077227
§ 371 (c)(1),
(2) Date: Dec. 2, 2015

(87) PCT Pub. No.: WO2016/119319
PCT Pub. Date: Aug. 4, 2016

(65) Prior Publication Data
US 2016/0364040 A1    Dec. 15, 2016

(30) Foreign Application Priority Data
Jan. 26, 2015   (CN) .......................... 2015 1 0038883

(51) Int. Cl.
*G06F 3/044*   (2006.01)
*G06F 3/041*   (2006.01)

(52) U.S. Cl.
CPC ............ *G06F 3/044* (2013.01); *G06F 3/0412* (2013.01); *G06F 3/0416* (2013.01); *G06F 2203/04103* (2013.01); *G06F 2203/04107* (2013.01)

(58) Field of Classification Search
None
See application file for complete search history.

(56) References Cited

U.S. PATENT DOCUMENTS

2009/0273577 A1    11/2009  Chen et al.
2011/0102361 A1*    5/2011  Philipp .................. G06F 3/044
                                                           345/174
2014/0204284 A1     7/2014  Yao et al.

FOREIGN PATENT DOCUMENTS

CN      202453610 A     9/2012
CN      103294256 A     9/2013
(Continued)

OTHER PUBLICATIONS

The Second Chinese Office Action dated Jul. 11, 2017; Appln. No. 201510038883.X.
(Continued)

*Primary Examiner* — Amare Mengistu
*Assistant Examiner* — Shawna Stepp Jones
(74) *Attorney, Agent, or Firm* — Ladas & Parry LLP

(57) ABSTRACT

A touch screen and a display device are provided. The touch screen includes first strip electrodes and second strip electrodes, which are disposed in different layers and intersect with each other. The first strip electrodes disposed in a layer above the second strip electrodes have patterns to prevent Moire fringes caused by interference. In the touch period at least some of the first strip electrodes are configured to load touch scanning signals while the second strip electrodes are configured to couple with the voltage signals of the touch scanning signals and output signals; or in the touch period
(Continued)

the second strip electrodes are configured to bad touch scanning signals while at least some of the first strip electrodes are configured to couple with the voltage signals of the touch scanning signals and output signals. The touch screen can reduce Moire fringes at the edges of the first strip electrodes caused by interference of light due to regular patterns.

20 Claims, 6 Drawing Sheets

(56) References Cited

FOREIGN PATENT DOCUMENTS

| | | |
|---|---|---|
| CN | 103927034 A | 7/2014 |
| CN | 203882297 U | 10/2014 |
| CN | 104298406 A | 1/2015 |
| CN | 204229379 U | 3/2015 |
| CN | 104536634 A | 4/2015 |
| JP | 2011-138154 A | 7/2011 |

OTHER PUBLICATIONS

First Chinese Office Action dated Feb. 4, 2017; Appln. No. 201510038883.X.
International Search Report and Written Opinion both dated Oct. 10, 2015: Appln. No. PCT/CN2015/077227.

* cited by examiner

TOUCH SCREEN AND DISPLAY DEVICE

TECHNICAL FIELD

At least one embodiment of the present invention relates to a touch screen and a display device.

BACKGROUND

At present, a capacitive touch screen is generally formed by incorporating patterns of a touch structure in a touch screen, so that the positions where the fingers touch can be detected by means of, for example, mutual capacitance.

For example, the patterns of a touch structure generally include a plurality of transparent strip-shaped touch driving electrodes and a plurality of transparent strip-shaped touch sensing electrodes, which are disposed in different layers and intersect with each other.

SUMMARY

Embodiments of the present invention provide a touch screen and a display device to eliminate the visibility of Moire fringes on the surface of the touch screen and thereby improve the display quality of the touch screen.

An embodiment of the present invention provides a touch screen, which includes first strip electrodes and second strip electrodes disposed in a layer under the first strip electrodes and intersecting the first strip electrodes. The first strip electrodes have patterns to prevent interference that causes Moire fringes. In a touch period, at least some of the first strip electrodes are configured to load touch scanning signals while the second strip electrodes are configured to couple with the voltage signals of the touch scanning signals and output signals; or in the touch period, the second strip electrodes are configured to load touch scanning signals while at least some of the first strip electrodes are configured to couple with the voltage signals of the touch scanning signals and output signals.

At least one embodiment of the present invention provides a display device including the above-mentioned touch screen provided in the embodiment of the present invention.

BRIEF DESCRIPTION OF DRAWINGS

In order to clearly illustrate the technical solutions of embodiments of the present invention, the drawings for the embodiments will be briefly described in the following; it is obvious that the drawings to be described hereafter are only related to some embodiments of the present invention and thus are not limitative of the present invention.

FIG. 1b is an enlarged view at position A in FIG. 1a;

DETAILED DESCRIPTION

Figure 1A:
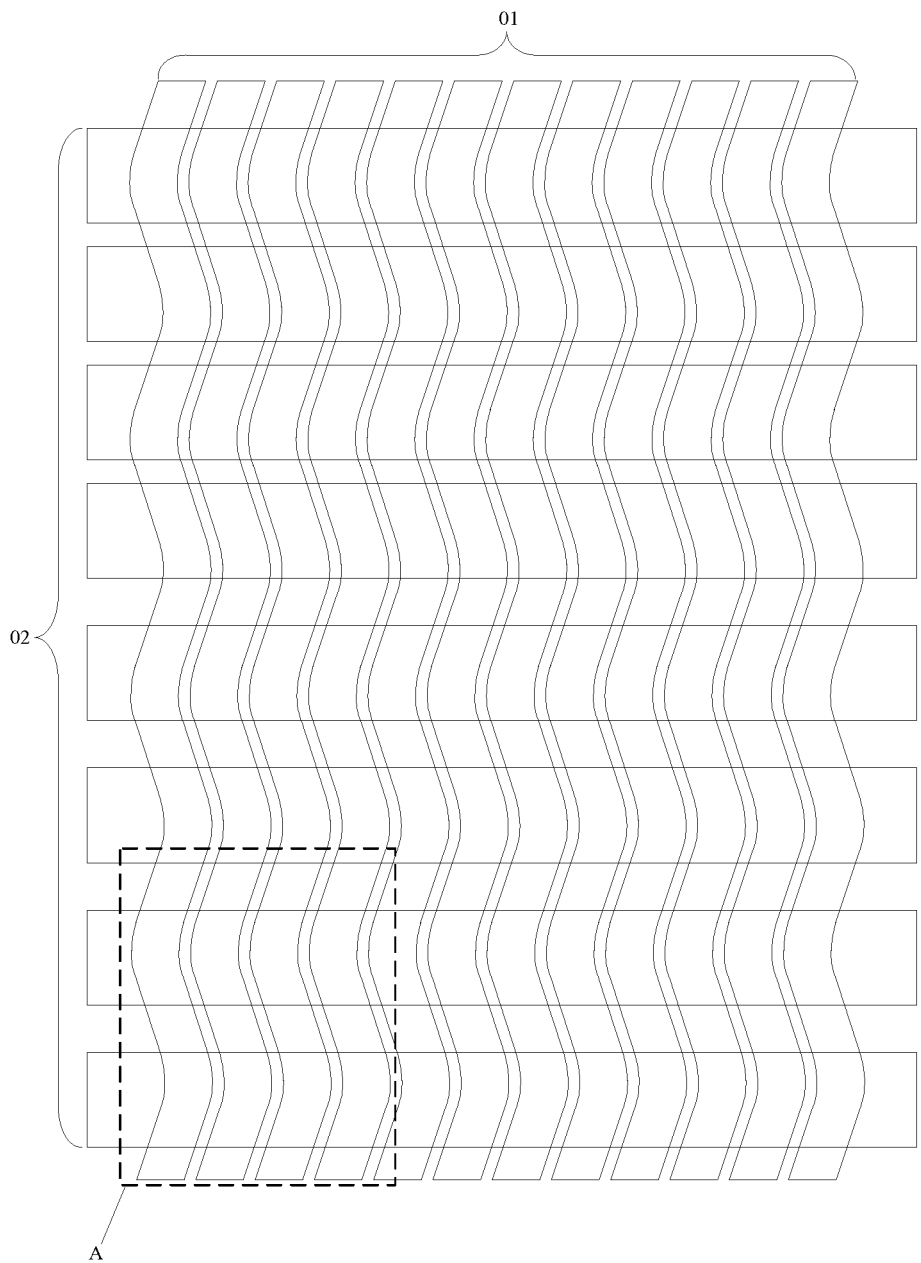
FIG. 1a is a first top view of a touch screen provided in an embodiment of the present invention.

In order to make objects, technical details and advantages of embodiments of the present invention apparent, the technical solutions of the embodiments will be described in a clearly and fully understandable way in connection with the drawings related to the embodiments of the present invention. It is obvious that the embodiments to be described are only some, not all, of the embodiments of the present invention. Based on the described embodiments herein, those skilled in the art can obtain other embodiments without any creative work, which fall within the scope claimed by the present invention.

Thicknesses and shapes of individual layers of film in the drawings do not reflect the real scale, but only serve to illustrate the contents of the present invention.

During the study of touch screens, the inventors of the present application has noticed that, in the touch structure having two layers of transparent electrodes, the strip electrodes in the upper layer are prone to interfere with the regular patterns of the pixel structure of the touch screen, such as the patterns of the black matrix layer, causing Moire fringes that disadvantageously affect the display quality of the touch screen.

An embodiment of the present invention provides a touch screen, which includes first strip electrodes and second strip electrodes disposed in a layer under the first strip electrodes and intersecting the first strip electrodes. In the following description, the case where the first strip electrodes extend in the vertical direction while the second strip electrodes extend in the horizontal direction will be taken as an example. The first strip electrodes have patterns which capable of preventing interference that may cause Moire fringes. In a touch period, at least some of the first strip electrodes are configured to load touch scanning signals while the second strip electrodes are configured to couple with the voltage signals of the touch scanning signals and output signals, i.e., at least some of the first strip electrodes serve as touch driving electrodes while the second strip electrodes serve as touch sensing electrodes correspondingly. Alternatively, in the touch period, the second strip electrodes are configured to load touch scanning signals while at least some of the first strip electrodes are configured to couple with the voltage signals of the touch scanning signals and output signals, i.e., the second strip electrodes serve as touch driving electrodes while at least some of the first strip electrodes serve as touch sensing electrodes correspondingly.

In the above-mentioned touch screen provided in the embodiment of the present invention, the second strip electrodes disposed in a layer under the first strip electrodes means that the second strip electrodes are closer to the array substrate of the touch screen than the first strip electrodes. In embodiments of the present invention, because the first strip electrodes provided above have patterns to prevent interference that may cause Moire fringes, Moire fringes caused by interference of light due to regular patterns are reduced at the edges of the first strip electrodes, so that the visibility of Moire fringes on the surface of the touch screen is eliminated and thereby the display quality of the touch screen is improved.

In practice, in the above-mentioned touch screen provided in an embodiment of the present invention, all the first strip electrodes disposed in the same upper layer of the touch screen should have their patterns relatively consistent with each other to make the patterns not observed by, i.e., invisible, for the users.

Moreover, in practice, in the above-mentioned touch screen provided in an embodiment of the present invention, there are a variety of ways to implement the patterns of the first strip electrodes to prevent interference that may cause Moire fringes, and specific patterns of the first strip electrodes will be described in detail in the following.

In at least one embodiment, the first strip electrode may be designed to have a pattern with wavelike structures on both edges along its extending direction. For example, the wavelike structure may take two forms. In one of the two forms, as illustrated in FIGS. 1a and 1b, the wavelike structure includes a plurality of zigzag line segments and a plurality of chamfering circular arc segments each being connected between two adjacent zigzag line segments; the angle θ formed between each zigzag line segment and the extending direction of the first strip electrodes 01 is a sharp angle, or as illustrated in FIG. 2 the wavelike structure includes a plurality of arc segments (the radii of curvature of the points on each arc segment may be the same or different).

As illustrated in FIGS. 1a to 5, the case where the first strip electrodes 01 extend in the vertical direction while the second strip electrodes 02 extend in the horizontal direction will be taken as an example for the following description.

Figure 2:
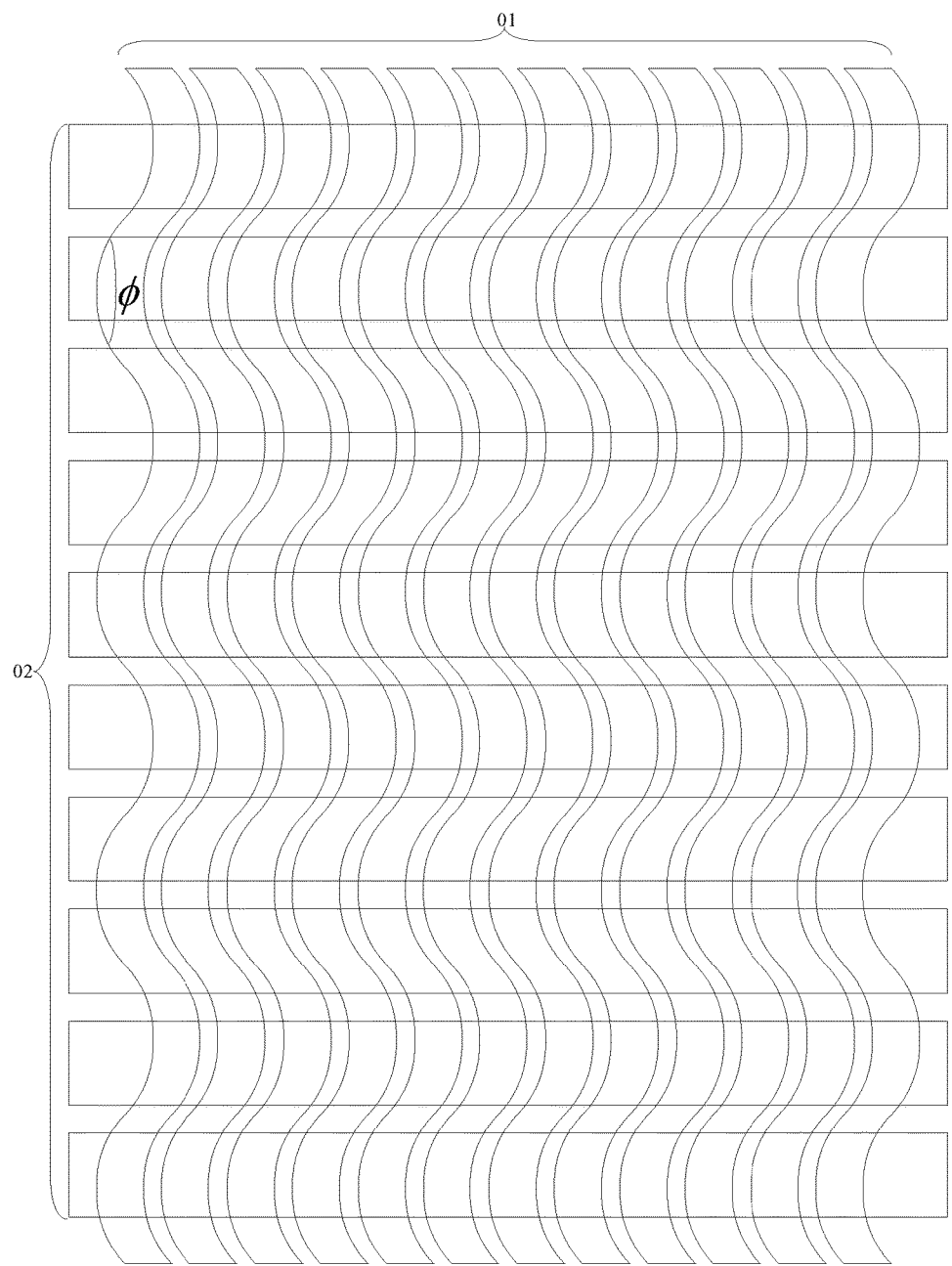
FIG. 2 is a second top view of a touch screen provided in an embodiment of the present invention.
Figure 3:
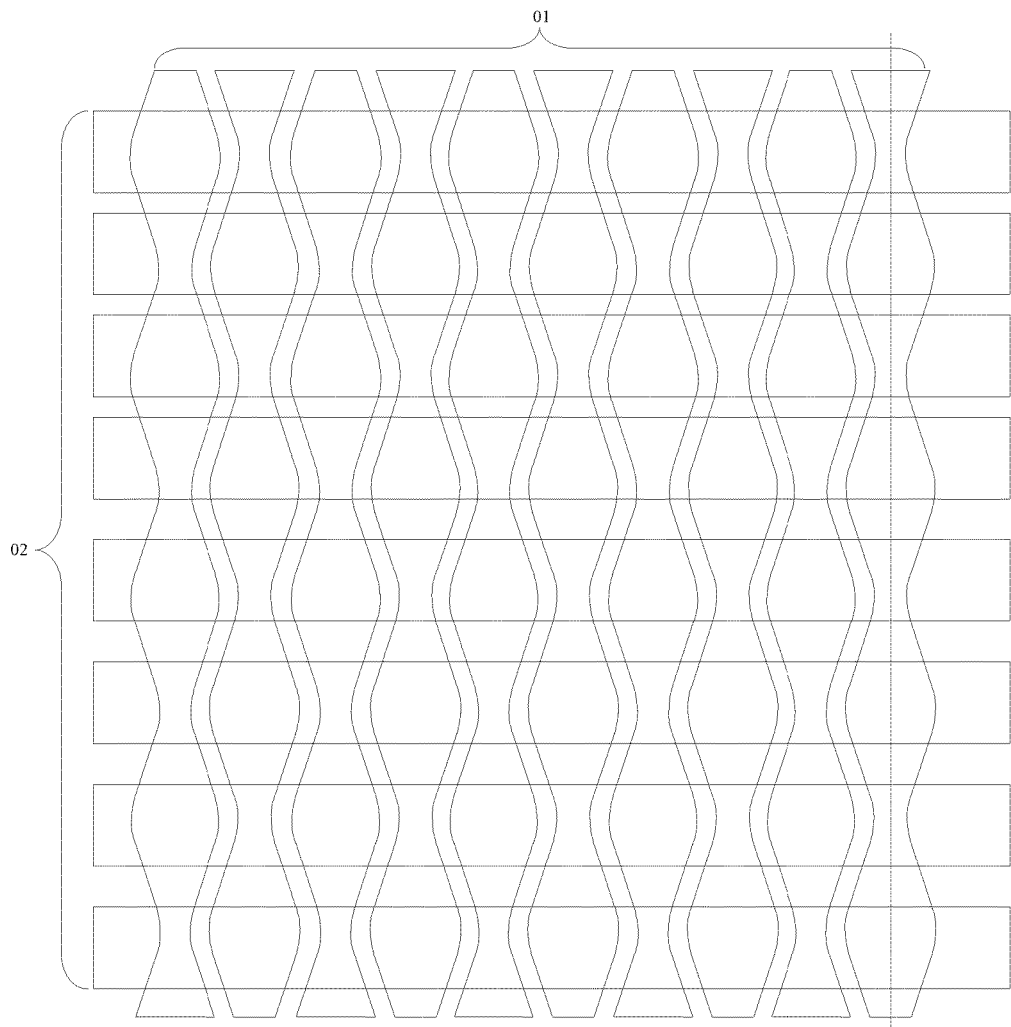
FIG. 3 is a third top view of a touch screen provided in an embodiment of the present invention.

For example, the wavelike structures on both edges of each first strip electrode 01 along its extending direction may be mirror symmetrical with respect to the extending direction, i.e., as shown in FIG. 3 the wavelike structures on both edges of the first strip electrode 01 are mirror symmetrical with respect to the vertical direction, i.e., the direction indicated by the broken line. Alternatively, as shown in FIGS. 1a and 2, each strip electrode 01 has parallel wavelike structures on both edges along its extending direction, i.e., in FIGS. 1a and 2 the zigzag lines of the wavelike structures on both edges of each strip electrode 01 have consistent orientations.

Figure 1B:
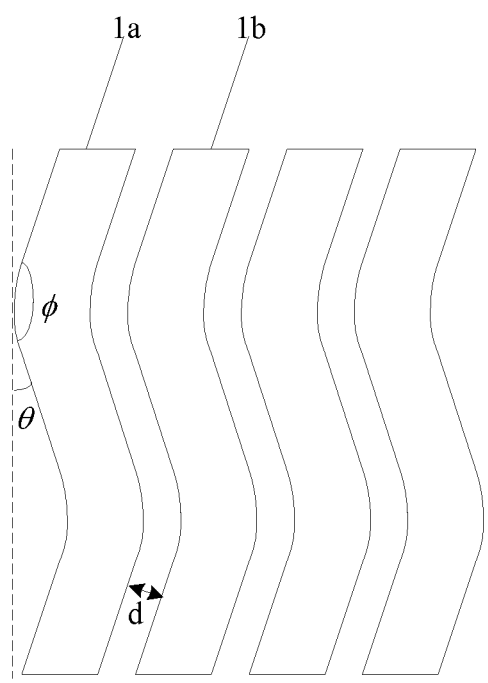

It is to be noted that, the structures in FIG. 3, compared with those in FIGS. 1a and 2, have higher randomness in pattern in the horizontal direction and thus are more effective to eliminate Moire fringes in the horizontal direction. Therefore, it is preferable to choose the structures as shown in FIG. 3 to design the pattern of the first strip electrodes 01 in practice.

In at least one embodiment, in the above-mentioned touch screen provided in the embodiment of the present invention, as shown in FIG. 1b which is the enlarged view at position A in FIG. 1a, when the angle θ formed by each zigzag line segment with respect to the extending direction of the first strip electrodes, i.e., the direction indicated by the broken line, is greater than or equal to 15° and less than or equal to 60°, the resultant first strip electrodes 01 will have good effects on elimination of Moire fringes. Moreover, in at least one embodiment, as shown in FIGS. 1b and 2, when the arc chord angle Φ of each arc or circular arc segment in the wavelike structures is greater than or equal to 60° and less than or equal to 120°, the resultant first strip electrodes 01 will have good effects on elimination of Moire fringes.

Figure 4:
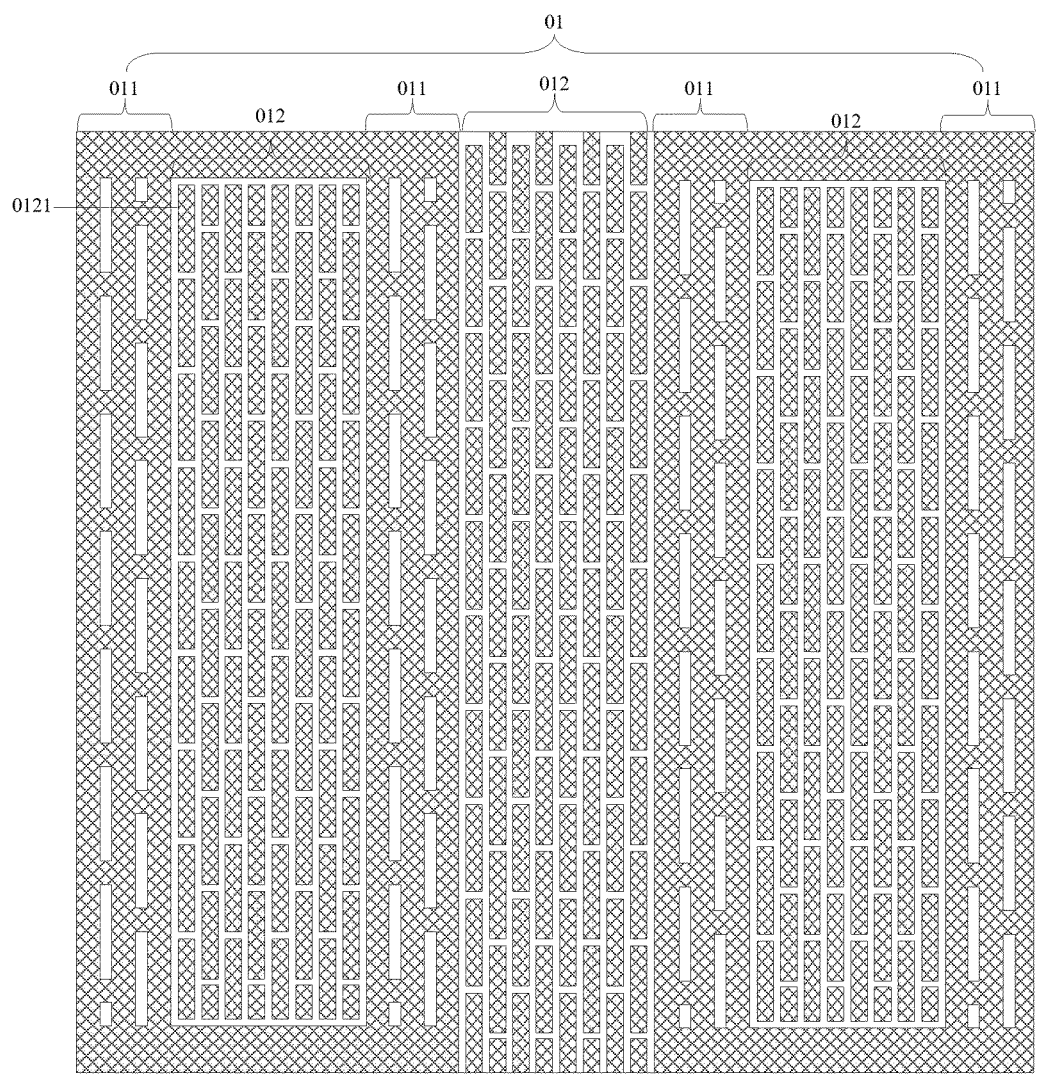
FIG. 4 is a fourth top view of a touch screen provided in an embodiment of the present invention.

In at least one embodiment, as shown in FIG. 4, the first strip electrodes 01 may be designed into a wall-like configuration. The so-called wall-like configuration means that the arrangement among the first strip electrodes 01 is similar to that of the bricks of a wall. For example, the wall-like configuration may includes a plurality of strip structures arranged into at least two columns, and in every two adjacent columns of strip structures, each strip structure in one column corresponds to at least two strip structures in the other column. In the following the wall-like configuration will be described in detail.

Moreover, in practice, in the above-mentioned touch screen provided in the embodiment of the present invention, it can be understood from experiments that the smaller the spacing between two adjacent first strip electrodes 01 is, the better the effects on the elimination of Moire fringes is. Therefore, in at least one embodiment, as shown in FIG. 1b, two adjacent first strip electrodes 01 may be designed to be parallel with each other. For example, adjacent wavelike structures belonging to the first strip electrodes 1a and 1b respectively are spaced consistently by a distance d in positions along the space therebetween.

Moreover, according to the current manufacturing process parameters, the spacing d between two adjacent first strip electrodes 01 can be set to be greater than or equal to 4 μm and less than or equal to 20 μm so as to achieve preferable effects on elimination of Moire fringes.

In at least one embodiment, in the above-mentioned touch screen provided in the embodiment of the present invention, in order to prevent interference between the signals loaded by the first strip electrodes 01 in a touch period, the first strip electrodes 01 disposed in the same layer may be, for example, divided into first touch electrodes 011 and floating electrodes 012, which are insulated from each other; when the second strip electrodes 02 are configured to couple with the voltage signals of the touch scanning signals and output signals during the touch period, the first touch electrodes 011 are configured to load the touch scanning signals, or when the second strip electrodes 02 are configured to load the touch scanning signals during the touch period, the first touch electrode 011 are configured to couple with the voltage signals of the touch scanning signals and output signals. During the touch period, the floating electrodes 012 are floated, i.e., receive no electrical signals, so as to shield interference between the electrical signals of the first touch electrodes 011.

It is to be noted that, the above mentioned "insulated from each other" means that the first touch electrodes 011 and the floating electrodes 012 are insulated from each other while the first touch electrodes 011 can be electrically connected as required. For example, as shown in FIG. 4, the strip electrodes 01 may be divided into 12 first touch electrodes 011 and 24 floating electrodes 012; every three first touch electrodes 011 constitute one group, every two adjacent groups of first touch electrodes 011 have 8 floating electrodes 012 disposed therebetween, and two groups of first touch electrodes 011 may act as one touch electrode as a whole if electrically connected.

Figure 5:
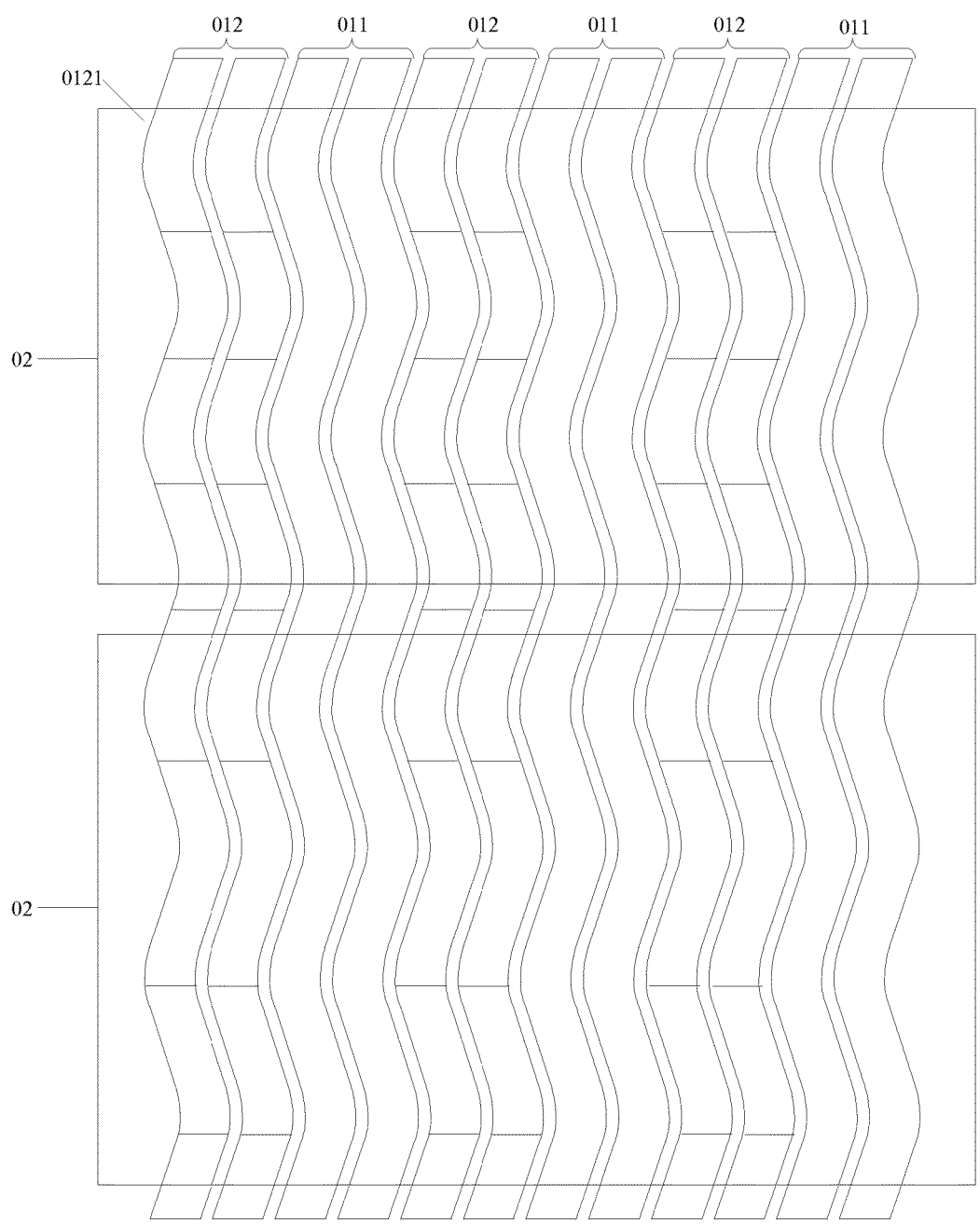
FIG. 5 is a fifth top view of a touch screen provided in an embodiment of the present invention.

Furthermore, the first touch electrodes 011 and the floating electrodes 012 may be arranged in other sequences. For example, as shown in FIG. 5, every two first touch electrodes 011 and every two floating electrodes 012 are arranged alternately and constitute the smallest unit. Of course, other arrangements can be used in practice, which is not limited here.

Moreover, in at least one embodiment, in the above-mentioned touch screens provided in the embodiment of the present invention, the first strip electrodes 01 disposed in the same layer may be divided into the first touch electrodes 011 and the floating electrodes 012 insulated from each other, and each floating electrode 012 may be further divided into a plurality of floating electrode blocks 0121, as shown in FIGS. 4 and 5.

There are a variety of ways to divide each floating electrode 012 into floating electrode blocks 0121, for example, as shown in FIGS. 4 and 5, each floating electrode 012 can be divided in such a way that the parting lines between the floating electrode blocks 0121 are parallel with the extending direction of the second strip electrodes 02.

Furthermore, in same one floating electrode 012, when the parting lines between floating electrode blocks 0121 are parallel with the extending direction of the second strip electrodes 02, the parting lines in two adjacent floating electrodes 012 may be in same one straight line as shown as FIG. 5 or in different straight lines as shown in FIG. 4. When the parting lines belong to two adjacent floating electrodes 012 respectively are staggered, i.e., the parting lines are not obtained by cutting straight lines, as shown in FIG. 4, the horizontal Moire fringes can be further prevented from occurring, which is more favorable for improving display quality.

In practice, the above-mentioned touch screen provided in an embodiment of the present invention may be an in-cell touch screen, an on-cell touch screen or a hybrid touch screen, which is not limited here.

Specifically, the above-mentioned touch screen provided in the embodiment of the present invention generally includes an opposite substrate and an array substrate disposed opposite to each other. Since the first strip electrodes 01 are required to be disposed in a layer above the second strip electrodes 02, the first strip electrodes 01 are disposed on the side of the opposite substrate away from the array substrate, i.e., the first strip electrodes 01 are disposed on the outer side of the opposite substrate, so that the sensibility to variation of touch signals produced by fingers is relatively high when at least some of the first strip electrodes 01 act as touch sensing electrodes. Alternatively, the first strip electrodes 01 are disposed on the side of the opposite substrate facing the array substrate, i.e., the first strip electrodes 01 are disposed on the inner side of the opposite substrate, so that it is easy for the touch screen as a whole to be thinned.

Furthermore, in the above-mentioned touch screen provided in the embodiment of the present invention, a plurality of pixel units arranged in an array are generally disposed between the opposite substrate and the array substrate; in at least one embodiment, to ensure that the wavelike structures of the first strip electrodes 01 have good effects on elimination of Moire fringes, each strip electrode 01 corresponds to at least two columns of or two rows of pixel units, i.e., corresponds to two columns of pixel units when it extends in the vertical direction, or corresponds to two rows of pixel units when it extends in the horizontal direction.

Furthermore, the above-mentioned touch screen provided in the embodiment of the present invention generally includes common electrodes disposed on the side of the opposite substrate facing the array substrate or on the side of the array substrate facing the opposite substrate. In order to reduce process steps in fabrication of the touch screen, the second strip electrodes may be disposed in the same layer as the common electrodes, or the second strip electrodes are disposed on the side of the array substrate facing the opposite substrate and perform the function of common electrodes as well.

Based on the same inventive concept, embodiments of the present invention further provide a display device including the above-mentioned touch screen provided in the embodiment of the present invention, which for example may be a capacitive touch screen. The display device may be any product or component with a display function, such as a liquid crystal display device, an OLED display device, a mobile telephone, a flat computer, a TV, a display, a notebook computer, a digital picture frame, a navigator and so on. Embodiments of the above mentioned touch screen may be referred to for implementations of the display device, which will not be repeated here.

In the touch screen and the display device provided in the embodiments of the present invention, the signals of the first and second strip electrodes may be set in any way known by those skilled in the art, which will not be detailed here.

Embodiments of the present invention provide a touch screen and a display device, which each include first strip electrodes and second strip electrodes that are disposed in different layers and intersect each other. The first strip electrodes are disposed in a layer above the second strip electrodes and have patterns to prevent interference that may cause Moire fringes. In a touch period, at least some of the first strip electrodes are configured to load touch scanning signals while the second strip electrodes are configured to couple with the voltage signals of the touch scanning signals and output signals; or in the touch period, the second strip electrodes are configured to load touch scanning signals while at least some of the first strip electrodes are configured to couple with the voltage signals of the touch scanning signals and output signals. Because the first strip electrodes have patterns to prevent interference that may cause Moire fringes, Moire fringes caused by interference of light due to regular patterns are reduced at the edges of the first strip electrodes, so that the Moire fringes are made invisible on the surface of the touch screen and thus the display quality of the touch screen is improved.

What has been described above is related to the illustrative implementations of the present invention only and not limitative to the scope of the present invention; the scope of the present invention is defined by the accompanying claims.

The present application claims priority of China patent application No. 201510038883.X filed on Jan. 26, 2015, the disclosure of which is incorporated herein in its entirety by reference as a part of the present application.

The invention claimed is:

1. A touch screen, comprising first strip electrodes and second strip electrodes disposed in a layer under the first strip electrodes and intersecting the first strip electrodes; wherein each of the first strip electrodes comprise a plurality of groups of first touch electrodes and floating electrodes insulated from each other to prevent interference that causes Moire fringes, two or more groups of first touch electrodes being connected electrically with each other;

in a touch period at least some of the first strip electrodes are configured to load touch scanning signals while the second strip electrodes are configured to couple with the voltage signals of the touch scanning signals and output signals; or in the touch period the second strip electrodes are configured to load touch scanning signals while at least some of the first strip electrodes are configured to couple with the voltage signals of the touch scanning signals and output signals.

2. The touch screen of claim 1, wherein the first strip electrodes have wavelike structures on both edges along an extending direction thereof; and the wavelike structures each comprise a plurality of zigzag line segments and a plurality of chamfering circular arc segments each connected between two adjacent zigzag line segments and an angle formed between each zigzag line segment and the extending direction of the first strip electrodes is a sharp one; or the wavelike structure comprises a plurality of arc segments.

3. The touch screen of claim 2, wherein the wavelike structures on both edges of each first strip electrode along its extending direction are mirror symmetrical with respect to the extending direction; or each first strip electrode has parallel wavelike structures on its both edges along the extending direction.

4. The touch screen of claim 2, wherein the angle formed between the zigzag line segments in the wavelike structures and the extending direction of the first strip electrodes is greater than or equal to 15° and less than or equal to 60°.

5. The touch screen of claim 2, wherein the arc chord angle of each arc or circular arc segment in the wavelike structures is greater than or equal to 60° and less than or equal to 120°.

6. The touch screen of claim 2, wherein two adjacent first strip electrodes are parallel with each other.

7. The touch screen of claim 6, wherein a spacing between two adjacent first strip electrodes is greater than or equal to 4 μm and less than or equal to 20 μm.

8. The touch screen of claim 2, wherein the first strip electrodes comprise first touch electrodes and floating electrodes insulated from each other; and in the touch period, when the second strip electrodes are configured to couple with the voltage signals of touch scanning signals and output signals, the first touch electrodes are configured to load the touch scanning signals, or when the second strip electrodes are configured to load touch scanning signals, the first touch electrodes are configured to couple with the voltage signals of the touch scanning signals and output signals.

9. The touch screen of claim 8, wherein each floating electrode is divided into a plurality of floating electrode blocks.

10. The touch screen of claim 8, wherein parting lines between the floating electrode blocks in a same floating electrode is parallel with the extending direction of the second strip electrodes.

11. The touch screen of claim 10, wherein the parting lines in two adjacent floating electrodes are in a same straight lines or in different straight lines.

12. The touch screen of claim 2, further comprising an opposite substrate and an array substrate disposed opposite to each other wherein the first strip electrodes are on a side of the opposite substrate away from the array substrate or on a side of the opposite substrate facing the array substrate.

13. The touch screen of claim 1, wherein the first strip electrodes have a wall-like configuration, which includes a plurality of straight line-like strip electrodes.

14. The touch screen of claim 1, wherein each group of first touch electrodes comprises three first touch electrodes, and every two adjacent groups of first touch electrodes comprises eight floating electrodes disposed therebetween; and in the touch period, when the second strip electrodes are configured to couple with the voltage signals of touch scanning signals and output signals, the first touch electrodes are configured to load the touch scanning signals, or when the second strip electrodes are configured to load touch scanning signals, the first touch electrodes are configured to couple with the voltage signals of the touch scanning signals and output signals.

15. The touch screen of claim 14, wherein each floating electrode is divided into a plurality of floating electrode blocks.

16. The touch screen of claim 15, wherein parting lines between the floating electrode blocks in a same floating electrode is parallel with the extending direction of the second strip electrodes.

17. The touch screen of claim 16, wherein the parting lines in two adjacent floating electrodes are in a same straight lines or in different straight lines.

18. The touch screen of claim 1, further comprising an opposite substrate and an array substrate disposed opposite to each other; wherein the first strip electrodes are on a side of the opposite substrate away from the array substrate or on a side of the opposite substrate facing the array substrate.

19. The touch screen of claim 18, wherein a plurality of pixel units arranged in an array are disposed between the opposite substrate and the array substrate and each first strip electrode corresponds to at least two columns of or two rows of pixel units.

20. A display device comprising a touch screen, wherein the touch screen comprises, first strip electrodes and second strip electrodes disposed in a layer under the first strip electrodes and intersecting the first strip electrodes; wherein each of the first strip electrodes comprise a plurality of groups of first touch electrodes and floating electrodes insulated from each other to prevent interference that causes Moire fringes, two or more groups of first touch electrodes are connected electrically with each other;

in a touch period at least some of the first strip electrodes are configured to load touch scanning signals while the second strip electrodes are configured to couple with the voltage signals of the touch scanning signals and output signals; or in the touch period the second strip electrodes are configured to load touch scanning signals while at least some of the first strip electrodes are configured to couple with the voltage signals of the touch scanning signals and output signals.

* * * * *